United States Patent [19]
Shirai

[11] Patent Number: 6,024,490
[45] Date of Patent: Feb. 15, 2000

[54] LINEAR GUIDE DEVICE

[75] Inventor: Takeki Shirai, Tokyo, Japan

[73] Assignee: THK Co. Ltd., Tokyo, Japan

[21] Appl. No.: 09/093,718

[22] Filed: Jun. 9, 1998

[30] Foreign Application Priority Data

Jul. 1, 1997 [JP] Japan .................................. 9-175729

[51] Int. Cl.$^7$ .................................................. F16C 29/06
[52] U.S. Cl. .................................. 384/13; 384/15; 384/45
[58] Field of Search ................................ 384/13, 15, 45, 384/44, 43

[56] References Cited

U.S. PATENT DOCUMENTS

| | | | |
|---|---|---|---|
| 4,582,369 | 4/1986 | Itoh | 384/13 |
| 5,139,347 | 8/1992 | Hattori | 384/15 |
| 5,399,023 | 3/1995 | Winkelmann et al. | 384/13 |
| 5,435,649 | 7/1995 | Kuwahara | 384/13 |
| 5,445,455 | 8/1995 | Holweg | 384/13 |
| 5,496,113 | 3/1996 | Winkelmann et al. | 384/13 |
| 5,678,927 | 10/1997 | Yabe et al. | 384/13 |

FOREIGN PATENT DOCUMENTS 5-71442  9/1993  Japan .

Primary Examiner—Thomas R. Hannon
Attorney, Agent, or Firm—Nikaido, Marmelstein, Murray & Oram LLP

[57] ABSTRACT

A linear guide device with which it is possible to prevent leakage of lubricant introduced into a slider and thereby reduce an amount of lubricant consumed and to surely lubricate rolling elements and an endless circulation passage thereof, and with which furthermore this can be achieved by means of a simple construction. According to the invention, in a linear guide device made up of a track rail having a rolling surface of rolling elements and a slider which has a load rolling surface facing the rolling surface of the track rail with the rolling elements therebetween and a rolling element return passage parallel with this load rolling surface and has arcuate direction-reversing passages for guiding rolling elements between the load rolling surface and the rolling element return passage and can move along the track rail as the rolling elements circulate endlessly, a lubricant supply hole connecting with one of the direction-reversing passages is provided in at least one or the other of front and rear end faces of the slider and the end face in which this lubricant supply hole is provided is covered with a platelike member and a lubricant supply groove connecting with the lubricant supply hole is formed in this end face and/or the inner face of the platelike member covering this end face and a lubricant supply passage is formed by the platelike member being fixed to the slider.

4 Claims, 8 Drawing Sheets

LINEAR GUIDE DEVICE

FIELD OF THE INVENTION AND RELATED ART STATEMENT

This invention relates to a linear guide device wherein a slider supporting a movable body such as a table moves along a track rail on rolling elements such as balls or rollers which circulate through the slider, and particularly to a construction improvement for surely supplying lubricant to the rolling elements.

Known linear guide devices of this kind include those made up of a track rail having ball rolling surfaces formed thereon and mounted on a stationary part such as a bed and a slider which is mounted on this track rail with multiple balls therebetween and moves along the track rail while supporting a movable body such as a table.

The slider is made up of a moving block and a pair of cover members. The moving block has load rolling surfaces facing the rolling surfaces of the track rail with balls therebetween and ball return passages parallel with these load rolling surfaces and can move along the track rail on the balls. The cover members have arcuate direction-reversing passages for guiding the balls between the load rolling surfaces and the ball return passages of the moving block. By the cover members being fixed to front and rear end faces of the moving block the ends of the load rolling surfaces and the ball return passages are connected and endless ball circulation passages are completed inside the slider.

Also, to prevent dust and the like adhered to the track rail from entering the inside of the slider as the slider moves, normally, platelike seal members made of a soft elastic material such as rubber are attached to these front and rear end faces, and the slider moves with these seal members in intimate contact with the surface of the track.

In using this linear guide device, from the point of view of suppressing wear of the balls themselves and wear of the rolling surfaces of the track rail and of the load rolling surfaces of the slider along which they roll and thereby maintaining highly accurate movement of the slider over a long period, it is necessary for a lubricant, for example grease, to be periodically or continuously supplied to these balls and the load rolling surfaces.

To this end, in the related art linear guide device described above, a channel to become a lubricant supply passage is formed in the rear face of a cover member of the slider, that is, the face abutting the moving block, and a lubricant supply passage connecting with endless ball circulation passage from the outside of the slider is completed when the cover member is fixed to the moving block.

However, because this cover member is made by injection molding of a relatively hard synthetic resin and when there is even slight distortion in the molded cover member a gap forms between the cover member and the end face of the moving block to which it is fixed, there has been the problem that lubricant introduced into the slider leaks out from between the cover member and the moving block and lubricant cannot be adequately spread throughout the endless ball circulation passage.

Because introduced lubricant leaks out like this, there has also been the problem that correspondingly more lubricant must be introduced for it to be possible to adequately lubricate the balls and the load rolling surface, and lubricant is thus consumed wastefully.

Also, there has been the problem that when grease is charged into the lubricant supply passage at a predetermined pressure by using a grease gun or the like, when a gap has formed between the cover member and the moving block, the filling pressure of the grease leaks out to the outside through this gap and consequently grease cannot be adequately fed to the end of the lubricant supply passage, i.e. to the endless ball circulation passage.

A linear guide device wherein an attempt has been made to prevent this kind of lubricant leakage is disclosed in Japanese Unexamined Utility Model Publication No. H.5-71442. Specifically, a lubricant supply hole is formed in a cover member having a ball direction-reversing passage, and lubricant is directly introduced into the ball direction-reversing passage through this supply hole from a lubricant supply pipe provided on the outside face of the cover member.

However, when this construction is employed, although it becomes possible to prevent the leakage of lubricant from between the moving block and the cover member, a pipe on the outside face of the cover member for introducing lubricant into the direction-reversing passage becomes necessary, and furthermore in consideration of the mounting of the seal member to the outside face of the cover member a recess in the outside face of the cover member for receiving this pipe also becomes necessary, and consequently there has been the problem that the number of parts increases and the structure of the cover member becomes more complicated.

OBJECT AND SUMMARY OF THE INVENTION

It is therefore an object of the present invention to provide a linear guide device with which it is possible to prevent the leakage of lubricant introduced into a slider and thereby reduce the amount of lubricant consumed and also to positively lubricate rolling elements and an endless rolling element circulation passage, and furthermore, this can be achieved by means of a simple construction.

To achieve this and other objects, the invention provides a linear guide device comprising a track rail having a rolling surface of rolling elements and a slider which has a load rolling surface facing the rolling surface of the track rail with the rolling elements therebetween and a rolling element return passage parallel with this load rolling surface and has arcuate direction-reversing passages for guiding rolling elements between the load rolling surface and the rolling element return passage and can move along the track rail with the rolling elements circulating endlessly, wherein a lubricant supply hole connecting with one of the direction-reversing passages is provided in at least one of the front and rear end faces of the slider and the end face in which this lubricant supply hole is provided is covered with a platelike member and a lubricant supply groove connecting with the lubricant supply hole is formed in this end face and/or the inner face of the platelike member covering this end face and a lubricant supply passage is formed by the platelike member being fixed to the slider.

According to the invention, when the platelike member is fixed to the end face of the slider, the supply groove formed in the end face of the slider or in the inner face of the platelike member is covered and a lubricant supply passage is completed by the slider and the platelike member. Then, lubricant can be supplied to the rolling element direction-reversing passage through this lubricant supply passage and the lubricant supply hole formed in the end face of the slider.

At this time, if a part of the platelike member abutting upon the slider is made from a viscoelastic material, the platelike member fixed to the slider tightly makes intimate contact with the end face of the slider and no gaps form between the platelike member and the slider. Thus, lubricant can be effectively prevented from leaking out from the lubricant supply passage completed by the slider and the platelike member, and the rolling elements and their endless circulation passage can be positively lubricated with a low consumption of lubricant.

And, since lubricant can be effectively prevented from leaking out from the lubricant supply passage in this way, even when grease is injected into the lubricant supply passage using a grease gun or the like, because the filling pressure at the time of this injection acts fully all the way to the end of the lubricant supply passage, grease can be surely introduced into the rolling element direction-reversing passage of the slider.

Thus, with a linear guide device according to the invention, because a lubricant supply passage is formed by the slider and the platelike member abutting tightly together, lubricant can be positively prevented from leaking out from between the slider and the platelike member, the amount of lubricant consumed can be reduced and the rolling elements and the endless circulation passage can be lubricated surely.

And, when a seal member is made to double as the platelike member, because the seal member itself is a constituent part employed in linear guide devices of the related art, in forming the lubricant supply passage by means of the slider and the seal member there is no addition of any special parts and the lubricant supply passage can thus be realized by means of a simple construction.

Here, from the point of view of preventing the leakage of lubricant from the lubricant supply passage still more surely, preferably, a strip-shaped projection which abuts with the end face of the slider is formed on the platelike member all the way around the periphery of the lubricant supply groove formed in the end face of the slider and/or the inner face of the plate like member covering the end face. When this is done, when the platelike member is fixed to the slider the strip-shaped projection makes intimate contact still more tightly with the end face of the slider and the lubricant supply passage can be made still more complete. If the platelike member is made by vulcanization molding of rubber, the strip-shaped projection can be easily molded integrally with the platelike member.

From the point of view of supplying the minimum amount of lubricant necessary to the rolling elements endlessly circulating inside the slider, preferably, a holding and supplying material for holding lubricant and supplying it gradually to the rolling elements inside the direction-reversing passage is packed into the lubricant supply hole and the lubricant supply groove. For example resin, rubber, or felt can be used for this holding and supplying material. When this is done, surplus lubricant does not flow out into the direction-reversing passage and only an amount of lubricant consumed as a result of circulation of the rolling elements flows through the holding and supplying material from the lubricant supply groove to the lubricant supply hole, and consequently the slider can be operated over a long period with an extremely small amount of lubricant. In addition, if the lubricant supply groove to become the lubricant supply passage is formed on the slider side and is made somewhat large, the amount of lubricant that can be impregnated into the holding and supplying material can be set large, and by this means it is possible to reduce the frequency with which the work of introducing lubricant into the slider must be carried out.

And, because lubricant held in a holding and supplying material, such as felt can flow against gravity as a result of capillarity, if this holding and supplying material is packed into the lubricant supply groove and the lubricant supply hole, lubricant can be positively supplied even to a direction-reversing passage to which it is relatively difficult to supply lubricant due to an influence of the operating attitude of the slider.

The rolling elements' in this invention includes balls and rollers, and the invention can effectively provide the effects described above in a linear guide device in which either balls or rollers are used.

DETAILED DESCRIPTION OF THE PREFERRED EMBODIMENTS

A linear guide device according to the invention will now be described in detail on the basis of the accompanying drawings.

Figure 1:
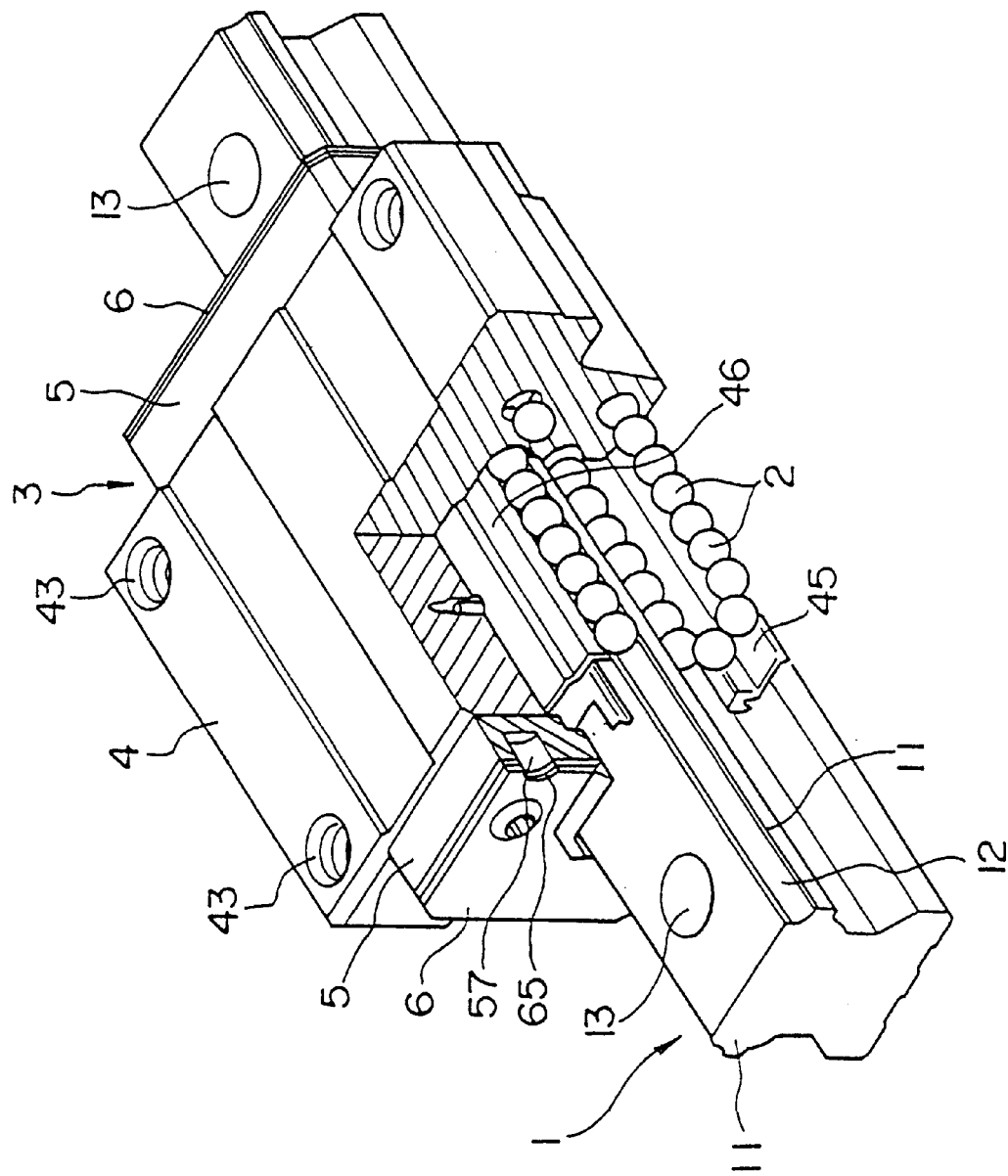
FIG. 1 is a perspective view of a first preferred embodiment of a linear guide device in which the invention has been applied.
Figure 2:
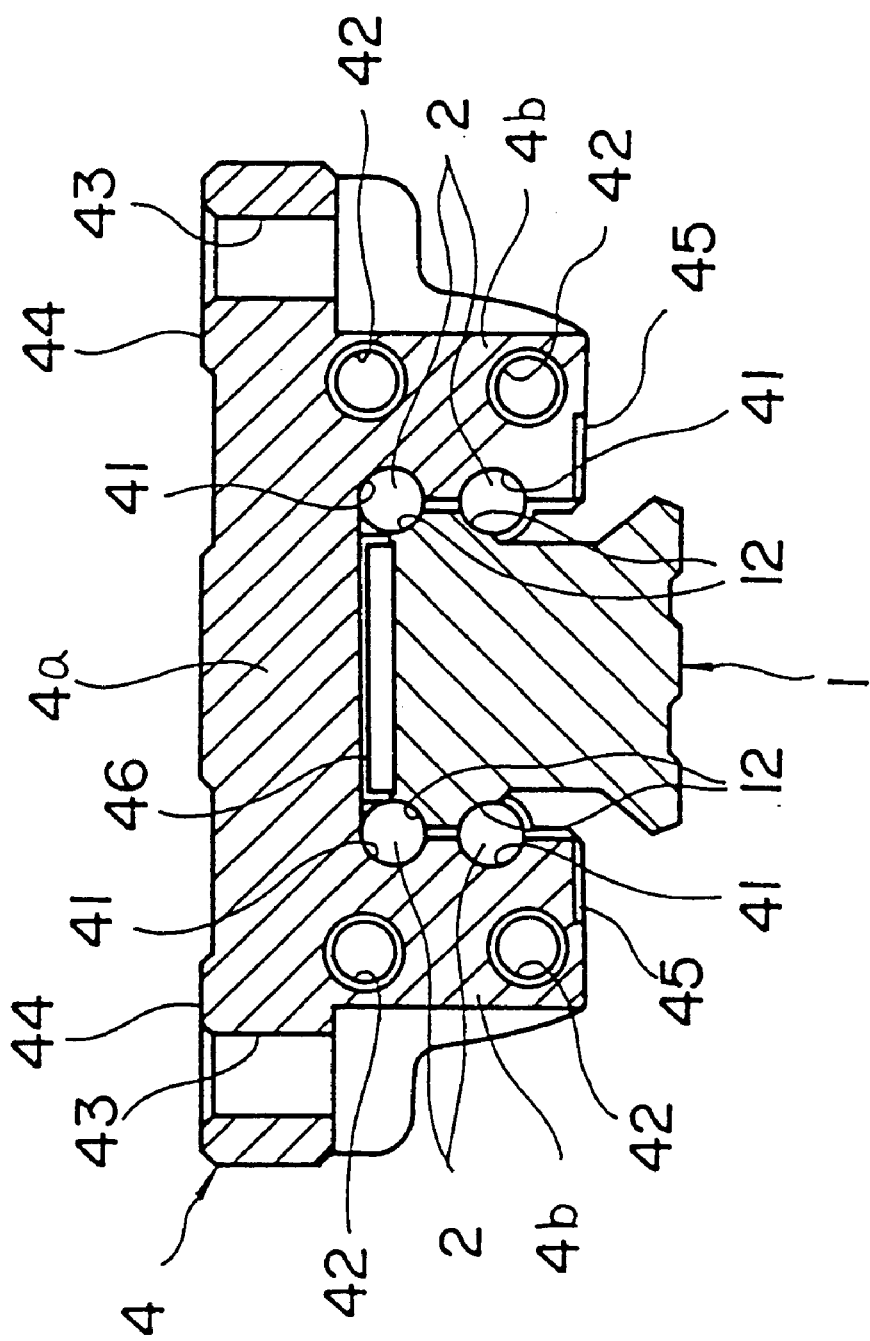
FIG. 2 is a sectional view of the same linear guide device.

FIG. 1 and FIG. 2 show a first preferred embodiment of a linear guide device according to the invention. In these figures, a track rail 1 has tongues 11 provided in the axial direction in left and right shoulder parts thereof. Ball rolling surfaces 12 for balls 2 to roll along are formed in upper and lower parts of each of the tongues 11, and each of the ball rolling surfaces 12 makes an angle of 45° to a cross direction and a thrust direction. This track rail 1 is fixed by fixing bolts (not shown) to a stationary part such as a bed (not shown). The reference numeral 13 in FIG. 1 denotes bolt holes through which these fixing bolts are passed.

The reference numeral 3 denotes a slider which moves along the track rail 1 and is made up of a moving block 4 which together with the track rail 1 sandwiches the balls 2, a pair of cover members 5 attached to front and rear end faces of this moving block 4, and a pair of seal members (platelike members) 6 fixed to the outer faces of these cover members 5.

As shown in FIG. 2, the moving block 4 is formed in the shape of a saddle straddling the track rail 1 and having a horizontal part 4a and a pair of sleeve parts 4b descending from the sides of this horizontal part 4a, and four load rolling surfaces 41 which together with the ball rolling surfaces 12 of the track rail 1 sandwich the balls 2 therebetween are formed on the inner faces of these sleeve parts 4b. Also, ball return passages 42, corresponding to the load rolling surfaces 41 and parallel therewith, pass through the sleeve parts 4b. Mounting parts 44, having bolt holes 43, are provided projecting from the side faces of the moving block 4, and the moving block 4 is fixed to a movable body such as a table (not shown) by fixing bolts (not shown) passing through the above-mentioned bolt holes 43 from below these mounting parts 44.

Ball-holding plates 45, 46 are respectively attached to the lower ends of the sleeve parts 4b of the moving block 4 and to the underside of the horizontal part 4a. These ball-holding plates 45, 46 are made, for example, by press molding of sheet metal or injection molding of a hard synthetic resin, and are for preventing the balls 2, rolling the load rolling surfaces 41 from falling out when the slider 3 is removed from the track rail 1.

Figure 3:
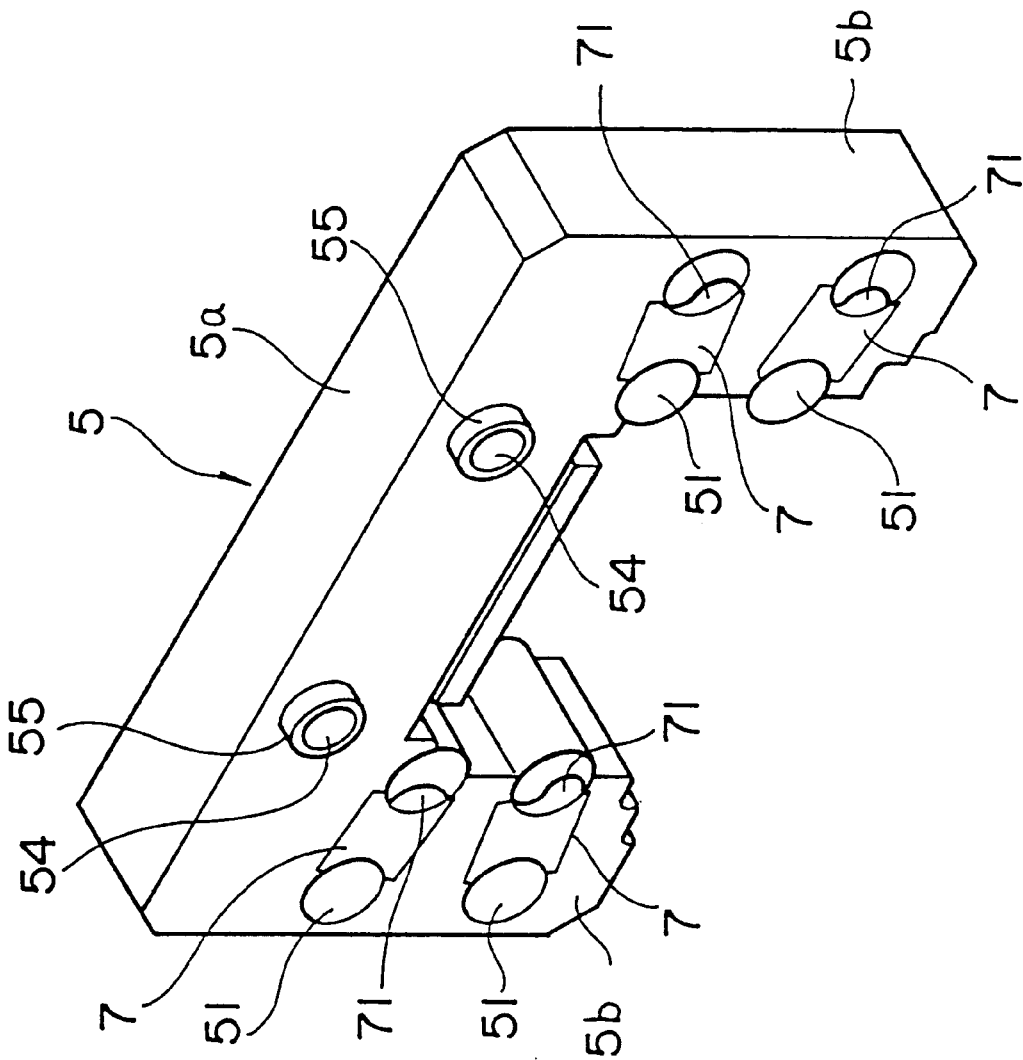
FIG. 3 is a perspective view of a cover member of the first preferred embodiment viewed from the side of a face thereof to be mounted to a moving block.

FIG. 3 is a perspective view of one of the cover members 5 seen from the rear face side. Each of the cover members 5 is formed in the shape of a saddle having a horizontal part 5a and a pair of sleeve parts 5b descending from the sides of this horizontal part 5a, like the moving block 4, and ball direction-reversing passages 51 severally connecting together the load rolling surfaces 41 and the ball return passages 42 of the block side are provided in the rear face sides of the sleeve parts 5b.

Figure 4:
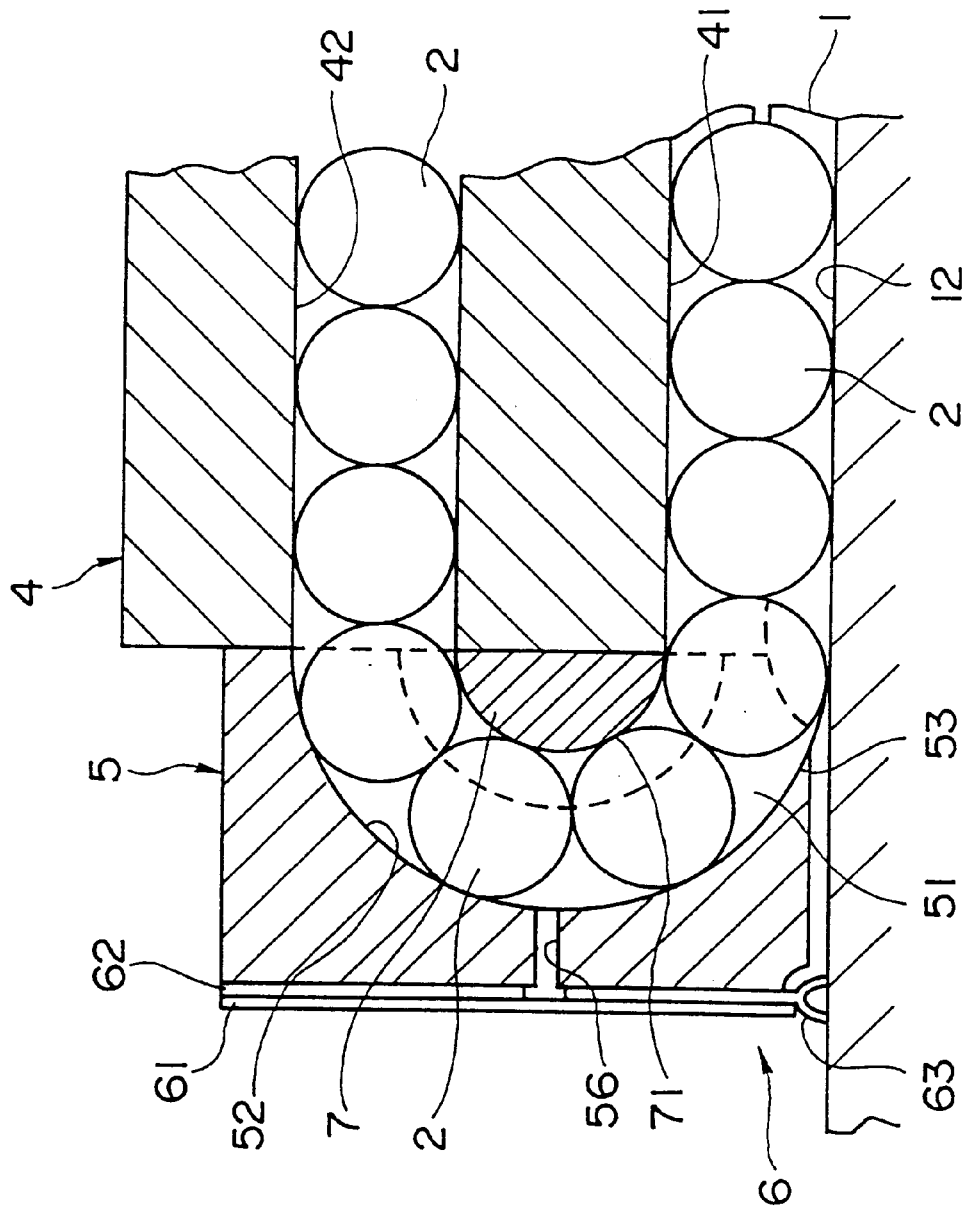
FIG. 4 is a sectional view of a ball direction-reversing passage formed in a cover member according to the first preferred embodiment.

FIG. 4 shows one of these ball direction-reversing passages 51 in detail. A substantially semi-circular outer guide surface 52 is formed in the cover member 5 and guides the balls 2 in a circular arc between the ball rolling surface 12 of the track rail 1 and the ball return passage 42. A scoop part 53 for scooping up balls 2 from the ball rolling surface 12 of the track rail 1 is formed at the end of this outer guide surface 52. A ball guide part 7 fits opposite this outer guide surface 52, and an inner guide surface 71 for guiding balls 2 between the ball return passage 42 and the load rolling surface 41 is formed on this ball guide part 7. That is, by the ball guide part 7 being fitted into the cover member 5 as shown in FIG. 4, the outer guide surface 52 and the inner guide surface 71 are brought face to face and a ball direction-reversing passage 51 is completed.

Lubricant supply holes 56 are provided severally extending between the outer face of the cover member 5 to which the seal member 6 is attached and the ball direction-reversing passages 51, and a lubricant such as grease can be introduced into the ball direction-reversing passages 51 through these lubricant supply holes 56 to lubricate the balls 2 rolling through the insides of the ball direction-reversing passages 51.

These cover members 5 are attached to the ends of the moving block 4 by means of hexagon socket head bolts passing through mounting holes 54. Bosses 55 for positioning are provided projecting from the rear face of each of the cover members 5 around the mounting holes 54, and by these bosses 55 being fitted into recesses (not shown) provided in the end faces of the moving block 4 the cover members 5 are accurately positioned with respect to the moving block 4. When the cover members 5 are thus attached to the moving block 4, the ball direction-reversing passages 51 of the cover members 5 and the ball return passages 42 of the moving block 4 are connected, and endless ball circulation passages for circulating the balls 2 from one end to the other of each of the load rolling surfaces 41 are completed.

Figure 5:
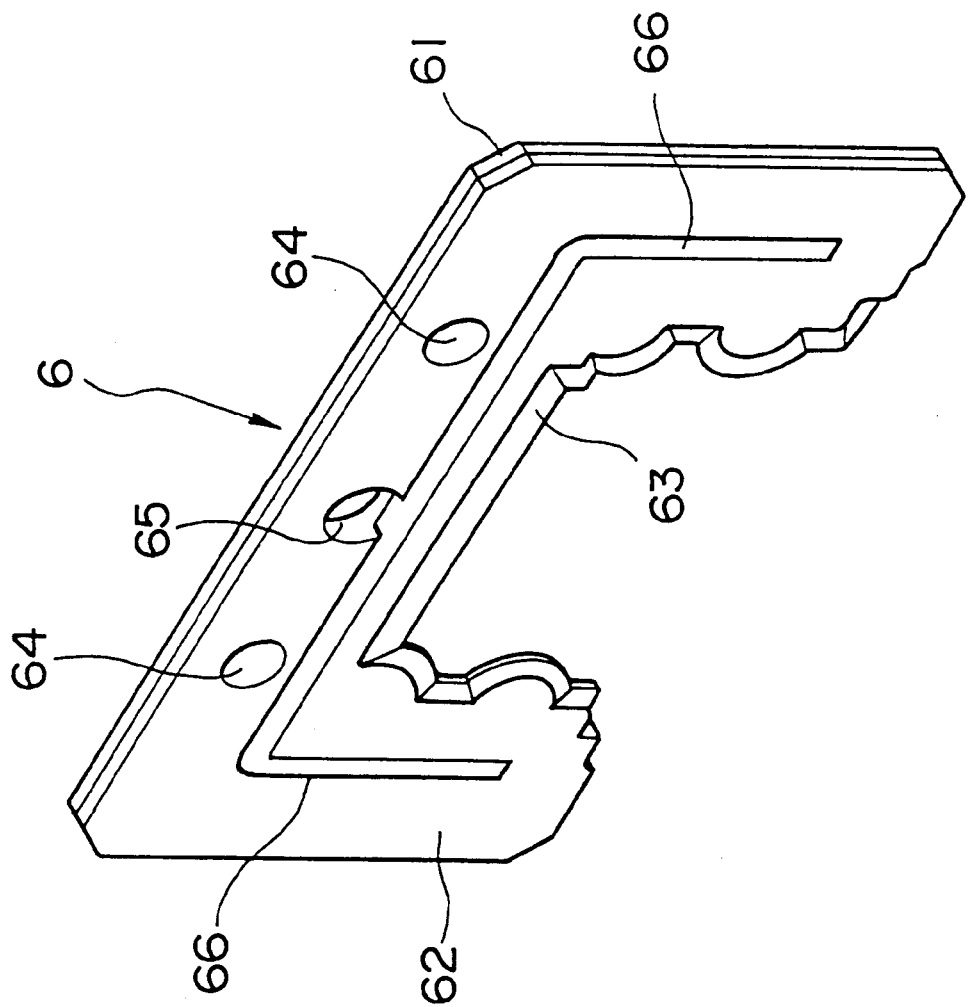
FIG. 5 is a perspective view of a seal member according to the first preferred embodiment viewed from the side of a face thereof to be mounted to a cover member.

As shown in FIG. 4 and FIG. 5, each of the seal members 6 is made by cladding the rear face side, that is, the side to abut the respective cover member 5, of a plate 61 serving as a core with a rubber molding part 62 by vulcanization molding, and overall is formed in the shape of a plate having substantially the same external shape as the cross-section of the cover member 5. A lip part 63 making sliding contact with the track rail 1 is formed integrally with the rubber molding part 62 along the side of the seal member 6 facing the track rail 1, and prevents dirt and lubricant and so on adhered to the track rail 1 from entering the inside of the slider 3 as the slider 3 moves. In FIG. 5, the reference numeral 64 denotes screw holes for fixing the seal member 6 to the cover member 5.

A grease reservoir 57 is formed in the end face of the cover member 5 to which this seal member 6 is fixed (see FIG. 1), and a grease nipple (not shown) can be screwed into this grease reservoir 57 through an oil supply opening 65 formed in the seal member 6.

A lubricant supply groove 66 connecting the grease reservoir 57 with the lubricant supply holes 56 is formed in the rubber molding part 62 of the seal member 6 abutting with the end face of the cover member 5, and by this seal member 6 being fixed to the end face of the cover member 5 a lubricant supply passage extending from the grease reservoir 57 to the ball direction-reversing passages 51 is completed.

Figure 6:
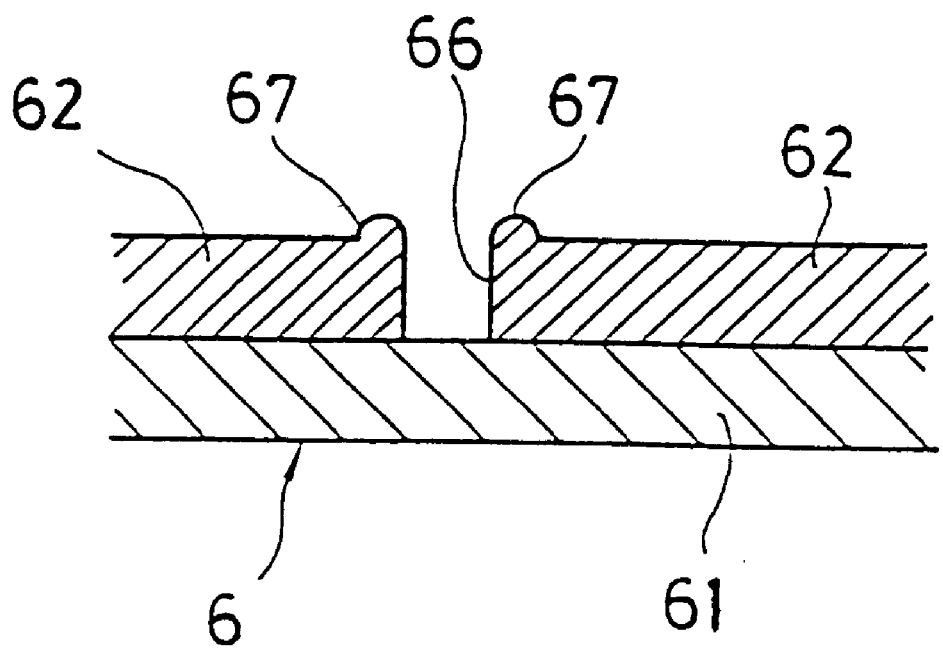
FIG. 6 is a sectional view showing a lubricant supply groove formed in the seal member.

Also, as shown in FIG. 6, a strip-shaped projection 67 is formed all the way along the sides of the lubricant supply groove 66, and when the seal member 6 is fixed to the cover member 5 the strip-shaped projection 67 tightly makes intimate contact with the end face of the cover member 5 and positively prevents lubricant from leaking out from the inside of the lubricant supply groove 66.

In a linear guide device of the present preferred embodiment constructed as described above, when grease is injected from a grease nipple attached to the cover member 5 using a grease gun, this enters the lubricant supply groove 66 of the seal member 6 via the grease reservoir 57 formed in the end face of the cover member 5, passes along this lubricant supply groove 66 and sprays out through the lubricant supply holes 56 into the ball direction-reversing passages 51. As a result, the balls 2 rolling through these ball direction-reversing passages 51 are lubricated by the grease and the grease spreads to the load rolling surfaces 41 and the ball return passages 42 as the balls 2 circulate.

At this time, because the rubber molding part 62 of the seal member 6 fixed to the cover member 5 is in abutment with the end face of the cover member 5 and this rubber molding part 62 is pressed by the plate 61 into intimate contact with the cover member 5, no gaps form between the seal member 6 and the cover member 5. Therefore, grease does not leak out from the grease reservoir 57 or the lubricant supply groove 66, and the grease introduced under pressure with the grease gun can be injected positively into the direction-reversing passages 51.

Although in the preferred embodiment described above grease is introduced using a grease gun, alternatively a construction may be adopted wherein a pipe is continuously connected to the slider 3 and a lubricant in mist form is blown into the lubricant supply groove 66 using this pipe.

Also, although in this preferred embodiment a seal member 6 originally for dust prevention is made to double as the platelike member forming a lubricant supply passage between itself and the slider 3 to avoid an increase in the number of parts resulting from the provision of the platelike member, alternatively a construction maybe adopted wherein for example a plate like member made of the same material is prepared separately from the seal member and this is attached to the end face of the slider to form a lubricant supply passage.

Next, a second preferred embodiment of a linear guide device according to the invention will be described.

Whereas in the first preferred embodiment described above the lubricant supply groove 66 was formed in the seal member 6 fixed to the cover member 5, in this second preferred embodiment the lubricant supply groove 66 is formed on the cover member 5 side and a holding and supplying material is packed inside this lubricant supply groove.

Figure 7:
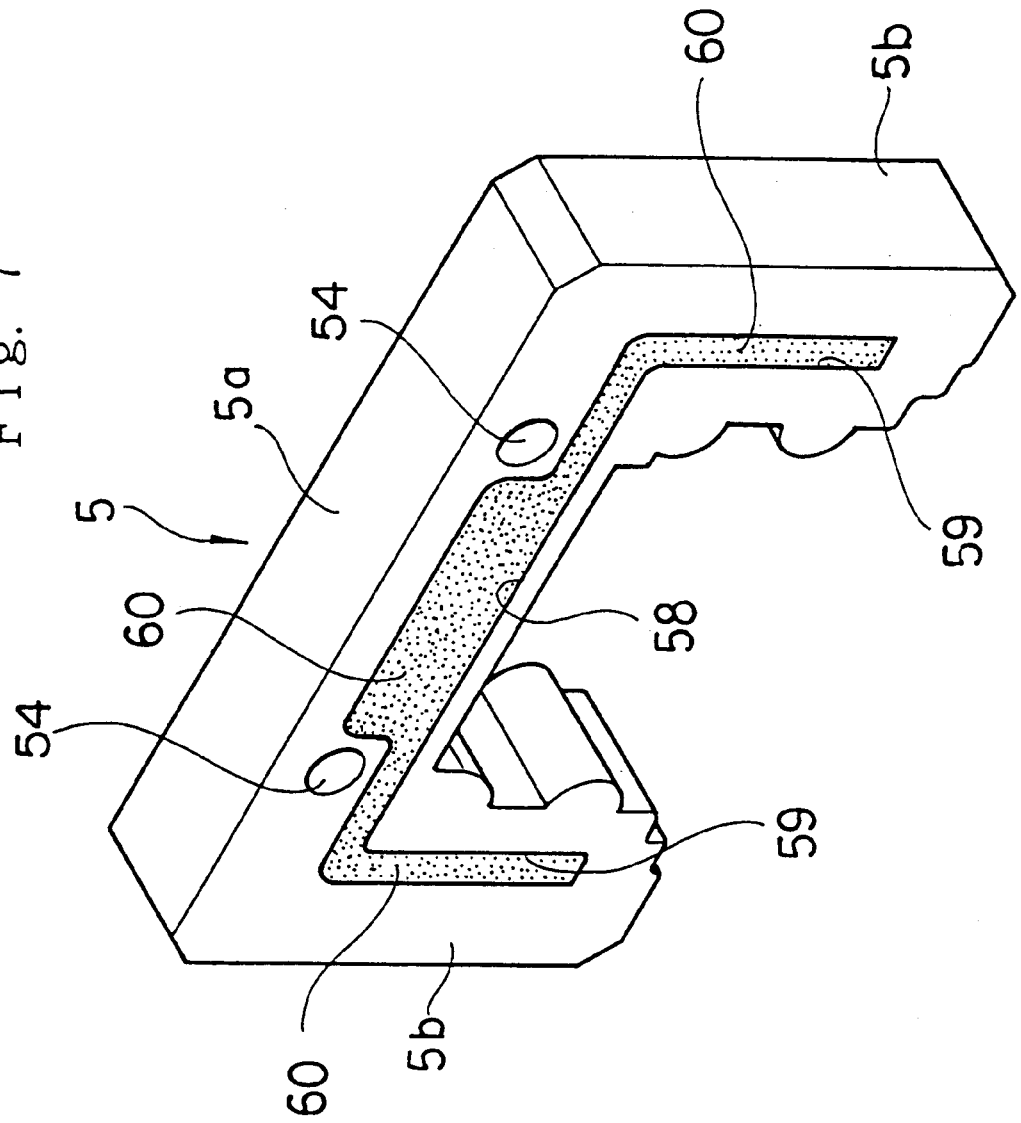
FIG. 7 is a perspective view of a cover member of a linear guide device of a second preferred embodiment viewed from the side of a face thereof to which a seal member is to be attached.

FIG. 7 is a perspective view of a cover member 5 of this preferred embodiment viewed from the side thereof to which a seal member 6 is to be attached. In this side of the cover member 5, a recess 58 for holding lubricant is formed in the horizontal part 5*a* of the cover member 5, and lubricant supply grooves 59 connecting with this recess 58 are formed in the sleeve parts 5*b*. Also, as described in the first preferred embodiment, lubricant supply holes 56 connecting with ball direction-reversing passages 51 are provided in this cover member 5, and the lubricant supply grooves 59 also connect with these lubricant supply holes 56. Felt 60 impregnated with a lubricant is packed in the recess 58, the lubricant supply grooves 59 and the lubricant supply holes 56.

Figure 8:
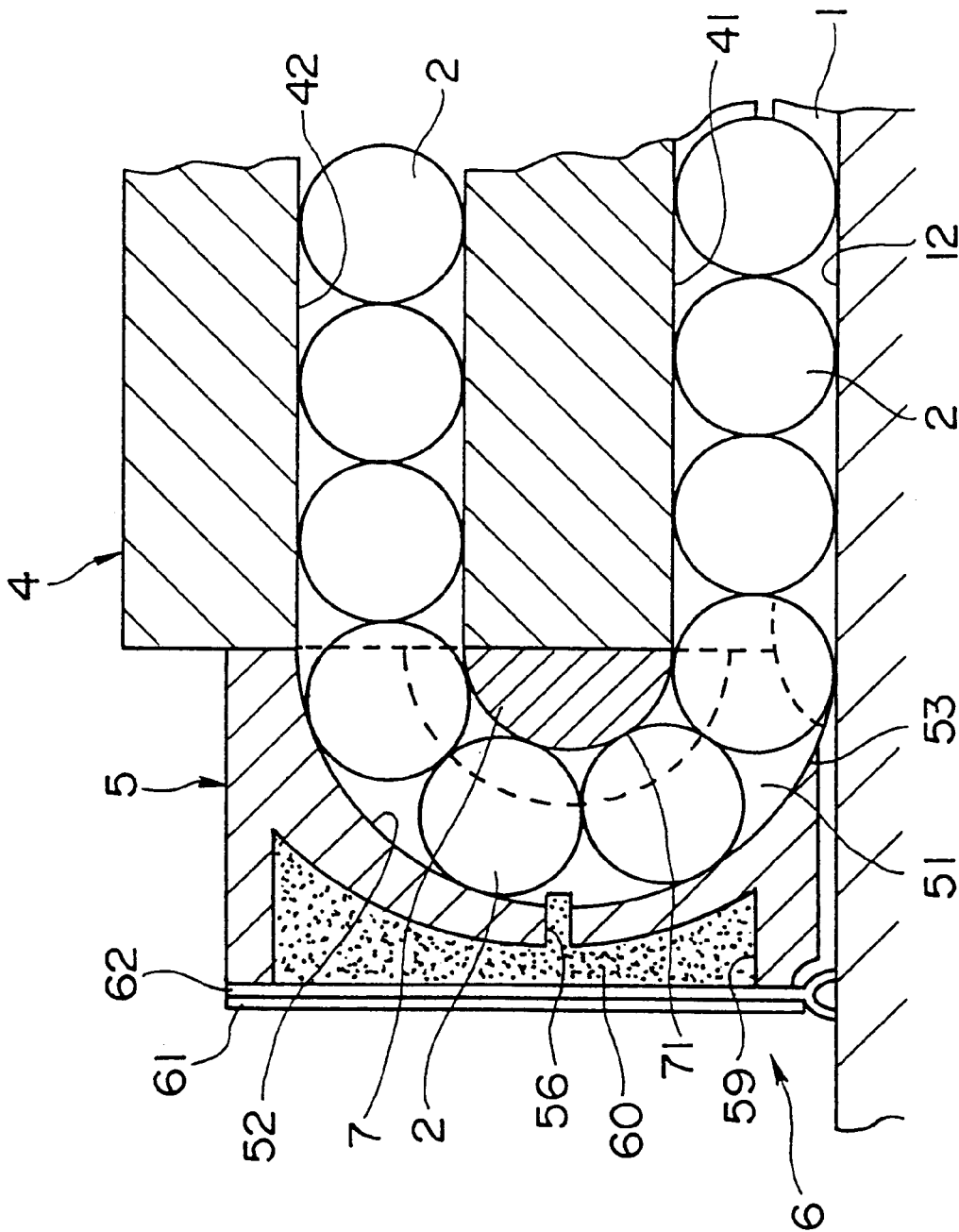
FIG. 8 is a sectional view of a ball direction-reversing passage formed in a cover member according to the second preferred embodiment.

FIG. 8 is a sectional view showing this cover member 5 of the second preferred embodiment fixed to the moving block 4 described above with a seal member 6 fixed to the cover member 5. When this cover member 5 is fixed to the moving block 4, as described above, each of the ball direction-reversing passages 51 of the cover member 5 is connected with a ball return passage 42 of the moving block 4 and completes an endless circulation passage for circulating balls 2 from one end to the other of a load rolling surface 41, and at this time, tips of the felt 60 packed in the lubricant supply holes 56 project slightly into the ball direction-reversing passages 51.

The rest of the construction of the cover member 5, i.e. the track rail 1 and the moving block 4 and so on, is exactly the same as in the first preferred embodiment described above and accordingly will not be described here.

In the linear guide device of this preferred embodiment also, when the seal member 6 is fixed to the cover member 5, the recess 58 and the lubricant supply groove 59, formed in the cover member 5, are covered by the seal member 6, and a lubricant supply passage extending from the recess 58 to the ball direction-reversing passages 51 is completed. At this time, because the rubber molding part 62 of the seal member 6 abuts tightly upon the cover member 5 and no gap is formed between the two, in this preferred embodiment also the leakage of lubricant from the recess 58 or the lubricant supply grooves 59 is positively prevented.

And, in this preferred embodiment, because felt 60 is packed into the recess 58, the lubricant supply grooves 59 and the lubricant supply holes 56, lubricant injected into the recess 58 through the oil supply opening 65 in the seal member 6 is absorbed and held by the felt 60 and passes through this felt 60 to the ball direction-reversing passages 51. Consequently, because lubricant is directly applied to the balls 2 from the felt 60 projecting slightly into the ball direction-reversing passages 51, lubricant does not flow out into the ball direction-reversing passages 51 wastefully and the balls 2 can be surely lubricated with the minimum necessary amount of lubricant.

Also, because in this preferred embodiment the recess 58 is formed slightly larger than the lubricant supply grooves 59 so that a substantial amount of lubricant can be held in the felt 60 inside this recess 58, lubricant injected through the oil supply opening 65 of the seal member 6 is not quickly consumed and thus it is possible to reduce the frequency with which the work of resupplying the slider with lubricant must be carried out while the linear guide device is in use.

What is claimed is:

1. A linear guide device comprising a track rail having a rolling surface of rolling elements and a slider which has a load rolling surface facing the rolling surface of the track rail with the rolling elements disposed therebetween and a rolling element return passage parallel to the load rolling surface and has arcuate direction-reversing passages for guiding the rolling elements between the load rolling surface and the rolling element return passage and can move along the track rail with the rolling elements circulating endlessly, wherein a lubricant supply hole connecting with one of the direction-reversing passages is provided in at least one of the front and rear outer end faces of the slider and the end face in which this lubricant supply hole is formed is covered with a platelike member, provided as a seal member which makes sliding contract with the track rail, and a lubricant supply groove connecting with the lubricant supply hole is formed in at least one of the end face and the inner face of the platelike member covering this end face, at least a part of the platelike member making contact with the end face of the slider consisting of a viscoelastic material, and a lubricant supply passage is formed by the platelike member being fixed to the slider.

2. A linear guide device according to claim 1, wherein a strip-shaped projection which abuts upon the end face of the slider is formed all the way around the periphery of the lubricant supply groove, and the lubricant supply groove is formed in the inner face of the platelike members.

3. A linear guide device according to claim 2, wherein a holding and supplying material for holding lubricant and gradually supplying it to the rolling elements inside the direction-reversing passage is packed into the lubricant supply hole and the lubricant supply groove.

4. A linear guide device according to claim 1, wherein said slider comprises a moving block and of at least one cover member located at at least one of front and rear end faces thereof and the lubricant supply hole is provided in at least one of the front and rear outer end faces of the at least one cover member and the end face of the at least one cover member in which the lubricant supply hole is formed is covered with a platelike member.

* * * * *